United States Patent
Gridley

(10) Patent No.: US 6,522,656 B1
(45) Date of Patent: *Feb. 18, 2003

(54) DISTRIBUTED PROCESSING ETHERNET SWITCH WITH ADAPTIVE CUT-THROUGH SWITCHING

(75) Inventor: Curtis D. Gridley, Ayer, MA (US)

(73) Assignee: 3Com Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/162,665

(22) Filed: Sep. 29, 1998

Related U.S. Application Data

(63) Continuation of application No. 08/609,603, filed on Mar. 1, 1996, now Pat. No. 5,926,473, which is a continuation of application No. 08/304,769, filed on Sep. 12, 1994, now Pat. No. 5,521,913.

(51) Int. Cl.[7] ............................................... H04J 3/22
(52) U.S. Cl. ..................... 370/428; 370/235; 370/401; 370/463
(58) Field of Search .................. 370/401, 428, 370/429, 463, 235, 236, 389, 392, 412; 709/232, 238, 240, 241, 242; 710/29, 33, 34, 35, 52, 53

(56) References Cited

U.S. PATENT DOCUMENTS

| | | | | |
|---|---|---|---|---|
| 4,296,492 A | * | 10/1981 | Hafer ........................... | 370/401 |
| 4,382,294 A | * | 5/1983 | Beuscher et al. ............ | 370/252 |
| 5,138,615 A | | 8/1992 | Lamport et al. ............. | 370/406 |
| 5,165,021 A | | 11/1992 | Wu et al. ..................... | 395/250 |
| 5,274,631 A | | 12/1993 | Bhardwaj ..................... | 370/60 |
| 5,307,345 A | | 4/1994 | Lozowick et al. ........... | 370/428 |
| 5,319,644 A | * | 6/1994 | Liang .......................... | 370/401 |
| 5,402,423 A | * | 3/1995 | Van Kersen et al. ........ | 370/401 |
| 5,408,469 A | | 4/1995 | Opher et al. ................. | 370/428 |
| 5,521,913 A | * | 5/1996 | Gridley ........................ | 370/389 |
| 5,537,099 A | * | 7/1996 | Liang .......................... | 340/825.07 |
| 5,682,383 A | * | 10/1997 | Dahod et al. ................ | 370/364 |
| 5,926,473 A | * | 7/1999 | Gridley ........................ | 370/389 |

FOREIGN PATENT DOCUMENTS

EP  0 404 337 A2  12/1990  ........... H04L/12/28

OTHER PUBLICATIONS

Saunders S., "Matrix–Based Switching Revs Up the LAN," *Data Communications*, New York, US, 23 (5):35–36 (Mar. 21, 1994).

(List continued on next page.)

*Primary Examiner*—Ricky Ngo
(74) *Attorney, Agent, or Firm*—McDonnell Boehnen Hulbert & Berghoff

(57) ABSTRACT

A packet switching system includes at least two network cards each receiving data packets via a plurality of associated ports, a system card, and an interconnect for connecting the system card to the network cards. Each one of the network cards comprises a plurality of port controllers for sending and receiving packets to and from a corresponding port and a packet processor for buffering packets received by the port controllers. The packet processor then sends destination addresses to the system card via the interconnect and receives forwarding information from the system card. The processor then forwards the packet in response to the forwarding information. The processor begins forwarding the packet in response to the forwarding information before the packet has been entirely received and checks the integrity of the packet by reference to check sum information contained in the packet as in cut-through switching. Future packets from the source port have their validity checked prior to forwarding in response to receiving an invalid packet from the source port as in store and forward switching.

9 Claims, 4 Drawing Sheets

OTHER PUBLICATIONS

Saunders, S., "Newcomer Takes a New Tack on LAN Switching," *Data Communications, New York, US, 23* (*13*):37–38 (Sep. 21, 1994).

Saunders, S., "LAN Switch Pulls Double Duty," *Data Communications, New York, US, 24* (*5*):37–38 (Apr. 1995).

Saunders, S., "Token Ring Switches Make it to Market," *Data Communications, New York, US, 24* (*4*):49–51 (Mar. 21, 1995).

Kwok, et al., "Cut–Through Bridging for CSMA/CD Local Area Networks," IEEE Transactions on Comm., vol. 38, No. 7, Jul. 1990, pp. 938–942 (Jul. 7, 1990).

* cited by examiner

DISTRIBUTED PROCESSING ETHERNET SWITCH WITH ADAPTIVE CUT-THROUGH SWITCHING

RELATED APPLICATIONS

This application is a Continuation of U.S. Ser. No.: 08/609,603, filed Mar. 1, 1996, now U.S. Pat. No. 5,926,473 which is a Continuation of U.S. Ser. No.: 08/304,769, filed Sep. 12, 1994, now U.S. Pat. No. 5,521,913, the entire teachings of the patent and application being incorporated herein by this reference.

BACKGROUND OF THE INVENTION

Ethernet switch architecture can be generally divided into two classes: shared memory and multiprocessor systems. In the shared memory architecture, packets, including a header with a source and destination addresses, a data payload, and a check sum portion at the end of the packet, are received at the ports and then forwarded to a system card via a backplane. Here, the packets are buffered in the same central memory, which is accessed by a single central controller. This controller looks at the destination address of the packet, and possibly other information such as source port and destination port, and then, via an address and other look-up tables, determines what should be done with the packet, such as forward, discard, translate or multicast. This forwarding decision is usually an identification of a LAN Card and a port of that LAN Card in the Ethernet switch that connects to the destination address. The address look-up table tells to which port of the Ethernet switch the packet must be sent to reach the addressed device. The packet is then forwarded to that LAN card. The designated LAN card receives the packet and routes it to the destination port where an Ethernet controller chip sends the packet out on the LAN to the addressed device.

The multiprocessing architecture differs in that a local processor is placed on each one of the cards and each one of these processors accesses and maintains its own address table. As a result, when a multiprocessor-type LAN card receives a packet through one of its ports, it first looks at the destination address and then determines to which one of the other ports on one of the other cards it must be sent and then sends the packet to that card via the backplane connecting the cards. If the port address of the packet happens to be on the same LAN card it was received on, the processor simply sends the packet to that local port address and the packet is never transferred on the backplane. This architecture has certain advantages in that since functionality is replicated between the cards, if any one of the cards should fail the Ethernet switch can still function although this also increases cost. One problem is, however, that a substantial amount of processing and software is devoted to ensuring the address tables on each one of the LAN cards are exact duplicates of each other.

Regarding the handling of the packet within the Ethernet switch, two basic methods are conventional. The first is called store and forward switching. In this switching scheme, a particular LAN card will wait until it has received the entire packet before forwarding it to either another LAN card or the central controller card. This allows the LAN card to confirm the packet is valid and uncorrupted by reference to the check sum information contained at the end of the packet. A new approach has been proposed which is called cut-through switching, a purpose of which is to decrease packet latency. Here, not yet fully received packets are forwarded to the destination port and begun to be sent out or broadcasted from the switch before the entire packet has been received. This both decreases packet latency and also decreases the amount of buffering RAM required by each LAN card. The problem with this approach, however, is that if the packet turns out to be invalid or corrupted there is no way to drop the packet since it is already been started to its destination.

SUMMARY OF THE INVENTION

The present invention is directed to a distributed processing archecture which yields most of the simplicity of the shared memory configuration while attaining the advantages and faster operation of multiprocessing configuration. In general, this is achieved by a packet switching system that includes at least two network cards each receiving data packets via a plurality of associated ports, a system card, and an interconnect for connecting the system card to the network cards. Each one of the network cards comprises a plurality of port controllers for sending and receiving packets to and from a corresponding port and a packet processor for buffering packets received by the port controllers. The packet processor then sends destination addresses to the system card via the interconnect and receives forwarding information from the system card. The processor then forwards the packet in response to the forwarding information.

In specific embodiments, the system card comprises an address look-up table correlating destination addresses with the ports of the system. Also, the packet is forwarded to a different one of the network cards indicated by the forwarding information via the interconnect.

The packet processor can be a hardware processor or even a programmable gate array.

In yet another embodiment, the processor begins forwarding the packet in response to the forwarding information before the packet has been entirely received and checks the validity of the packet by reference to check sum information contained in the packet. Future packets from the source port have their validity checked prior to forwarding in response to receiving an invalid packet from the source port.

In general, according to another aspect, the invention features an adaptive cut-through switching method for a packet switching system receiving and sending data from and to a network via a plurality of ports. This method comprises forwarding received packets to destination ports before the packet has been entirely received as in standard cut-through switching. The validity of the packets is, however, checked after the fact. If it turns out that the packet was invalid, future packets from the port are stored and their validity checked prior to forwarding, a store and forward configuration.

In specific embodiments, the integrity of the packets is checked by reference to check sum information contained in the packets.

In other embodiments, only packets, having source addresses from which invalid packets have been previously received, are placed into a store and forward mode. Alternatively, every packet from a port can be placed on store and forward in response to receiving an invalid packet from that port, regardless of its source address.

The above and other features of the invention including various novel details of construction and combinations of parts, and other advantages, will now be more particularly described with reference to the accompanying drawings and pointed out in the claims. It will be understood that the particular method and device embodying the invention is shown by way of illustration and not as a limitation of the invention. The principles and features of this invention may be employed and various and numerous embodiments without the departing from the scope of the invention.

BRIEF DESCRIPTION OF THE DRAWINGS

In the accompanying drawings, like reference numerals refer to the same parts throughout the different views. The drawings are not necessarily to scale and this has instead been placed upon illustrating the principles of the invention. Of the drawings.

DETAILED DESCRIPTION OF THE INVENTION

Figure 1:
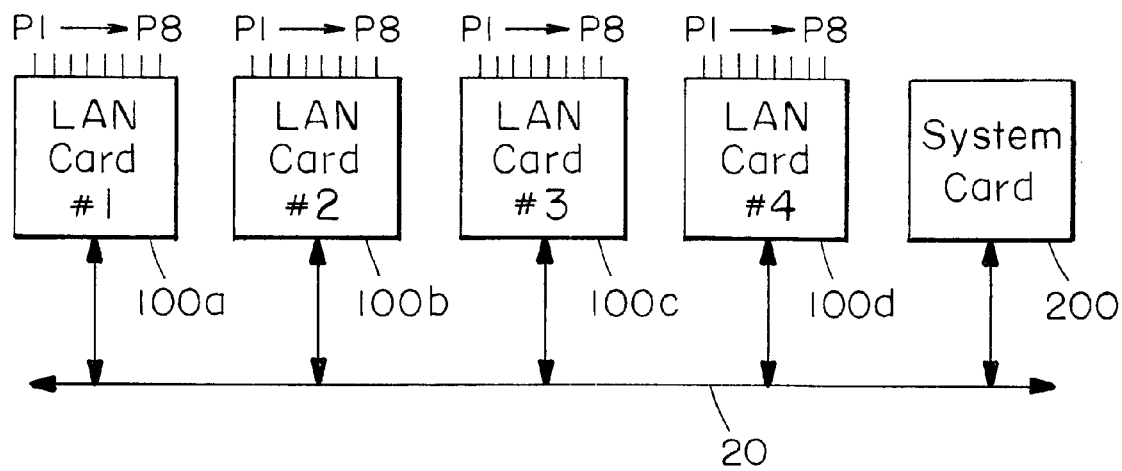
FIG. 1 is a block diagram illustrating the general layout of the Ethernet switch of the present invention.

Turning now to the figures, the internal architecture of an Ethernet switch constructed according to the principles of the present invention is generally illustrated in FIG. 1. Here, four LAN cards 100A–100D each have eight Ethernet ports P1–P8 for sending and receiving Ethernet packets. Although four LAN cards are shown specifically, it is generally understood that the number of LAN cards is expandable depending upon system requirements and capabilities. Each of these LAN cards 100A–100D are connected to each other and a system card 200 via a high-speed backplane 20. Although a backplane interconnect 20 is shown, other interconnects are possible such as crossbar or hierarchial types.

Figure 2:
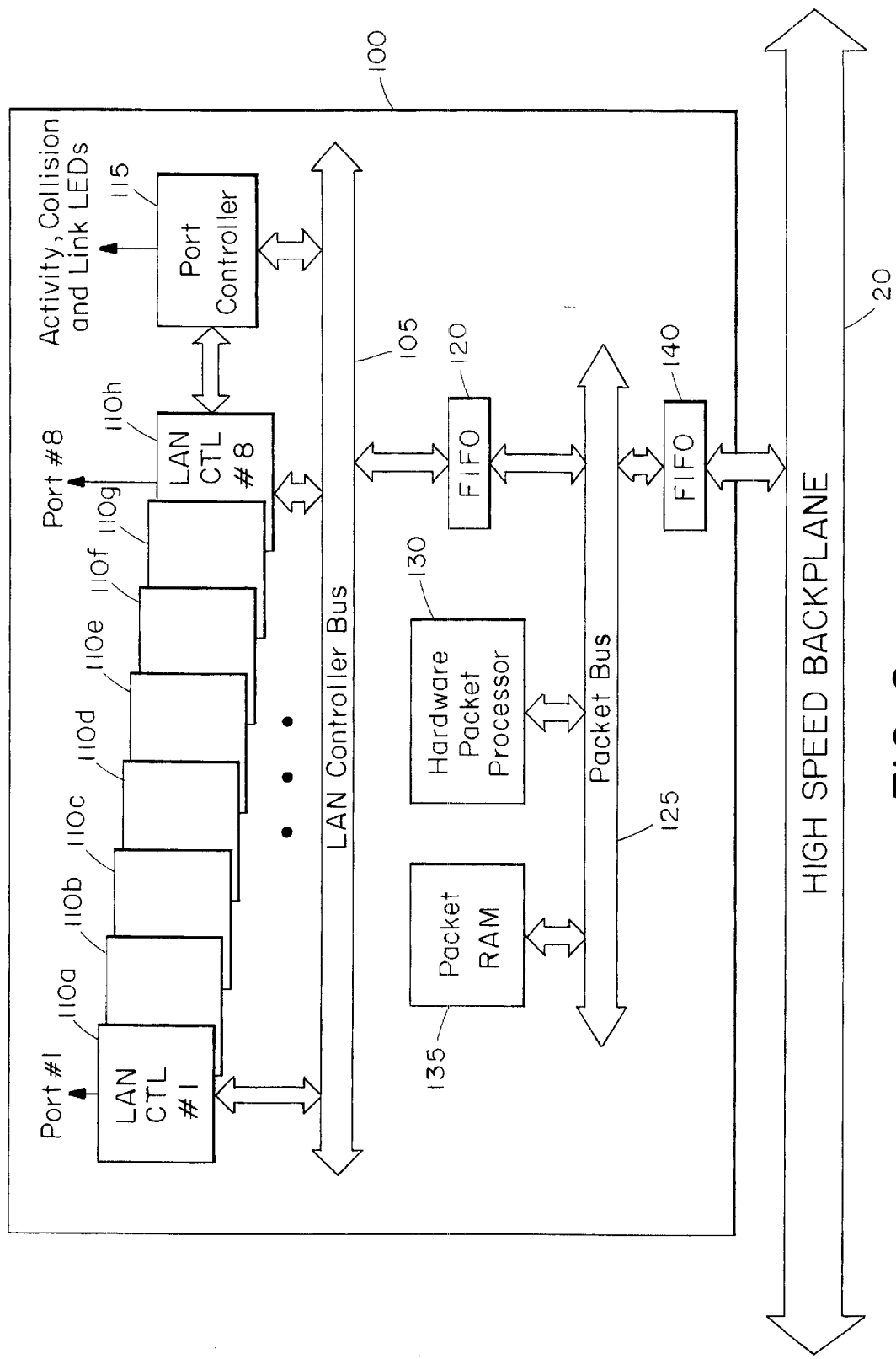
FIG. 2 is a block diagram showing the architecture of a LAN card of the present invention.

Referring to FIG. 2, a block diagram illustrating the internal architecture of the LAN cards is shown. Each LAN controller 110A–110H sends and receives packets to and from the eight ports, port P1–P8. Data received into any one of the ports, P1–P8, is sent out onto the LAN controller bus 105 to a controller-packet bus bidirectional FIFO (first in, first out) buffer 120. A port controller 115 coordinates the reading and writing by each of the LAN controllers 110A–110H and the FIFO 120 to ensure that no data collisions occur on the LAN controller bus 105 and to drive LED indicators on the card to show port activity. The bi-directional FIFO 120 transfers the data from the LAN controller bus 105 to the packet bus 125 where a hardware packet processor 130, preferably a programmable gate array or specialty hardware processor, reconstructs the packets in a high speed packet RAM 135. The packet RAM 135 serves as a packet buffer which stores the packets received in through each of the ports P1–P8 while the packet processor 130 obtains forwarding decisions, such as discard, translate, multicast, or forward to a destination LAN card and port, from the system card 200. More specifically, the hardware packet processor 130 sends the packet header, which includes source and destination addresses of the received packets now stored in the packet RAM 135, to the system card 200 on the backplane 20 via the packet-backplane FIFO 140.

Figure 3:
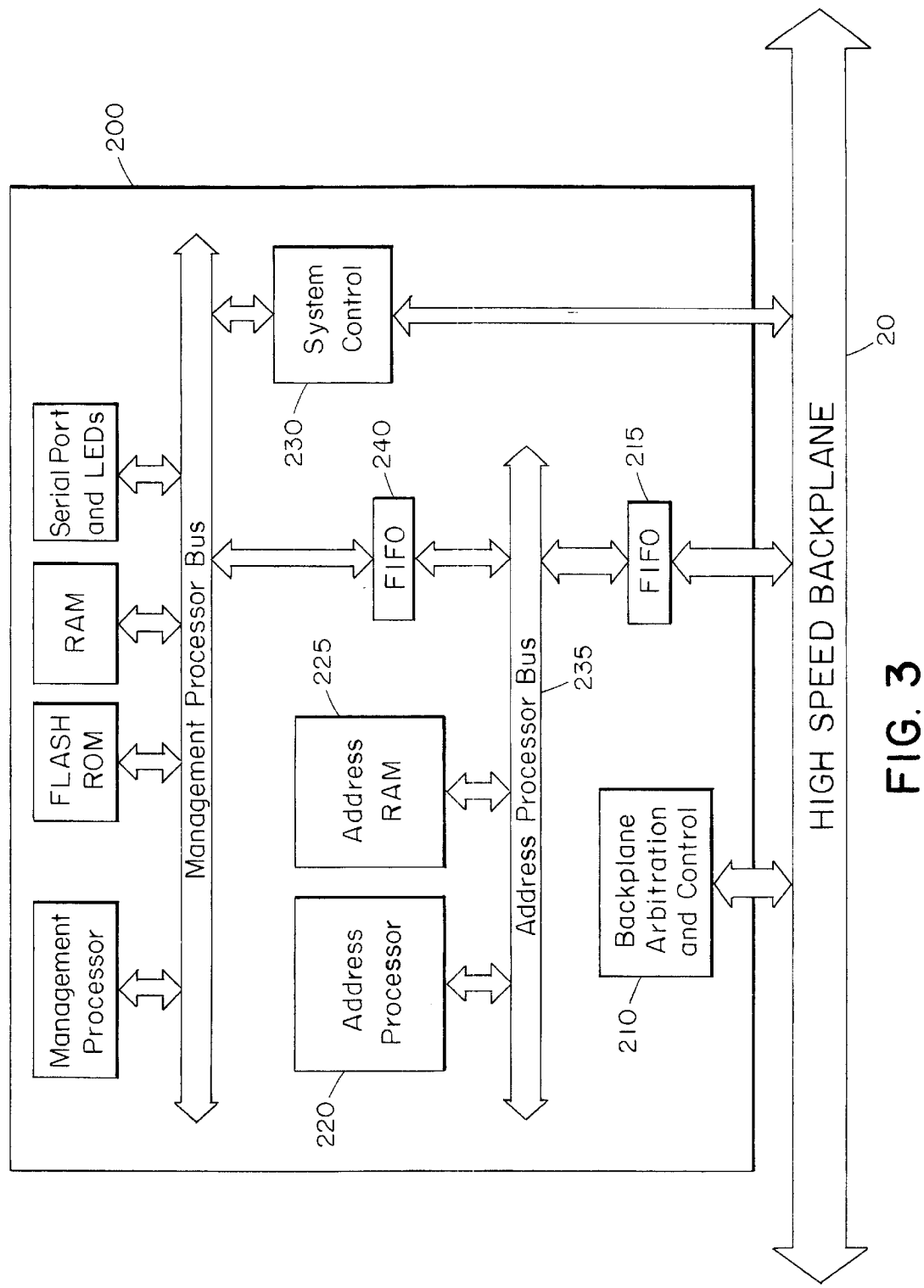
FIG. 3 is a block diagram illustrating the architecture of a system card of the present invention.

Referring to FIG. 3, the system card 200 receives packet source and destination addresses from each of the LAN cards 100A–100D via the backplane 20. A backplane arbiter and controller 210 controls access to the backplane 20 by each of the LAN cards to avoid data collisions on the backplane 20. Packet source and destination information is received from the backplane 20 into the system card 200 via a processor-backplane FIFO 215. Generally, an address processor 220, such as a TMS320 signal processor, updates and accesses an address RAM 225 which contains an address look-up table and other forwarding related decision tables including port states. Generally, the address look-up table correlates destination addresses contained in the Ethernet packets with a LAN card and port address of the Ethernet switch. In other words, the look-up tables in the address RAM 225 indicates to which port P1–P8 of which LAN card 100A–100D a particular packet must be forwarded to reach the device indicated by the destination address contained in that packet's header.

The forwarding decision indicating the internal LAN card and port address obtained from the address look-up table in the address RAM 225 by the address processor 220 is sent via the address processor bus 235 through the processor-backplane FIFO 215 and backplane 20 to the requesting LAN card 100.

Additionally, the system card 200 also contains a system controller which monitors the operation of each one of the LAN cards 100A–100D via the backplane 20 and the status of the address look-up table contained in the address RAM 225 via the address processor bus 235 through the management-address FIFO 240. Generally, the system controller 230 monitors the health of the Ethernet switch in general, such as the crashing or improper operation of any one of the LAN cards. It also keeps system statistics regarding throughput and packets destinations and sources along with any security considerations. Although, not explicitly shown, a backup system card can be included to increase switch reliability by adding central control redundancy.

Returning to FIG. 2, the forwarding decision is received by the hardware packet processor 130 via the backplane 20 through the packet-backplane FIFO 140 and the packet bus 125. If the port destination of the packet happens to be local to the particular card, then the packet is transferred to the LAN controller bus 105 via the controller-packet FIFO 120 to one of the LAN controllers 110A–110H for the designated port. If, however, the port destination lies on a different LAN card 100A–100D, then the packet is transferred via the backplane 20 to the designated LAN card where the hardware packet processor 130 of that LAN card transfers the packet to the proper LAN controller 110 on that card.

The present invention generally obtains the advantages associated with the multiprocessing architecture while maintaining the simplicity associated with the shared memory architecture. One of the problems associated with the shared memory architecture is that the entire packet including the data payload must traverse the backplane twice. The packet traverses the backplane when it is first sent from the receiving LAN card to the control card and then when it leaves the control card to go to the particular LAN card which has the address port. In the multiprocessing architecture, the packet is only transferred across the backplane when it must be sent to a different LAN card. Consequently, in some cases, the packet may never enter the backplane in situations in which the source and destination ports are located in the same LAN card. The present distributed processing architecture achieves much of the advantages in this realm as the multiprocessing architecture since the packet's data payload is only transferred across the backplane at most once. It should be noted, however, that the multiprocessing systems do not have to transfer the header across the backplane to obtain a forwarding decision. But, the multiprocessing configuration requires significant intercard traffic to synchronize the information look-up tables, which is not necessary in the present invention.

One advantage of the shared memory architecture has over the multiprocessing architecture is one of simplicity. In the multiprocessing architecture, substantial intelligence must be incorporated into each LAN card to maintain and update the local address look-up table in addition to coordinating between the LAN cards to ensure that the look-up tables are all identical. Here, the intelligence located on each LAN card is only that needed to buffer the packet when it is received, strip off the header and send it to the system card, then receive back the LAN card destination and port, and then send the packet to that LAN card or perform other forwarding decision related processing. As a result, the present invention achieves most of the efficiency of the multiprocessing schemes with cost effectiveness associated with the shared memory architecture.

Adaptive Cut-Through Switching

Figure 4:
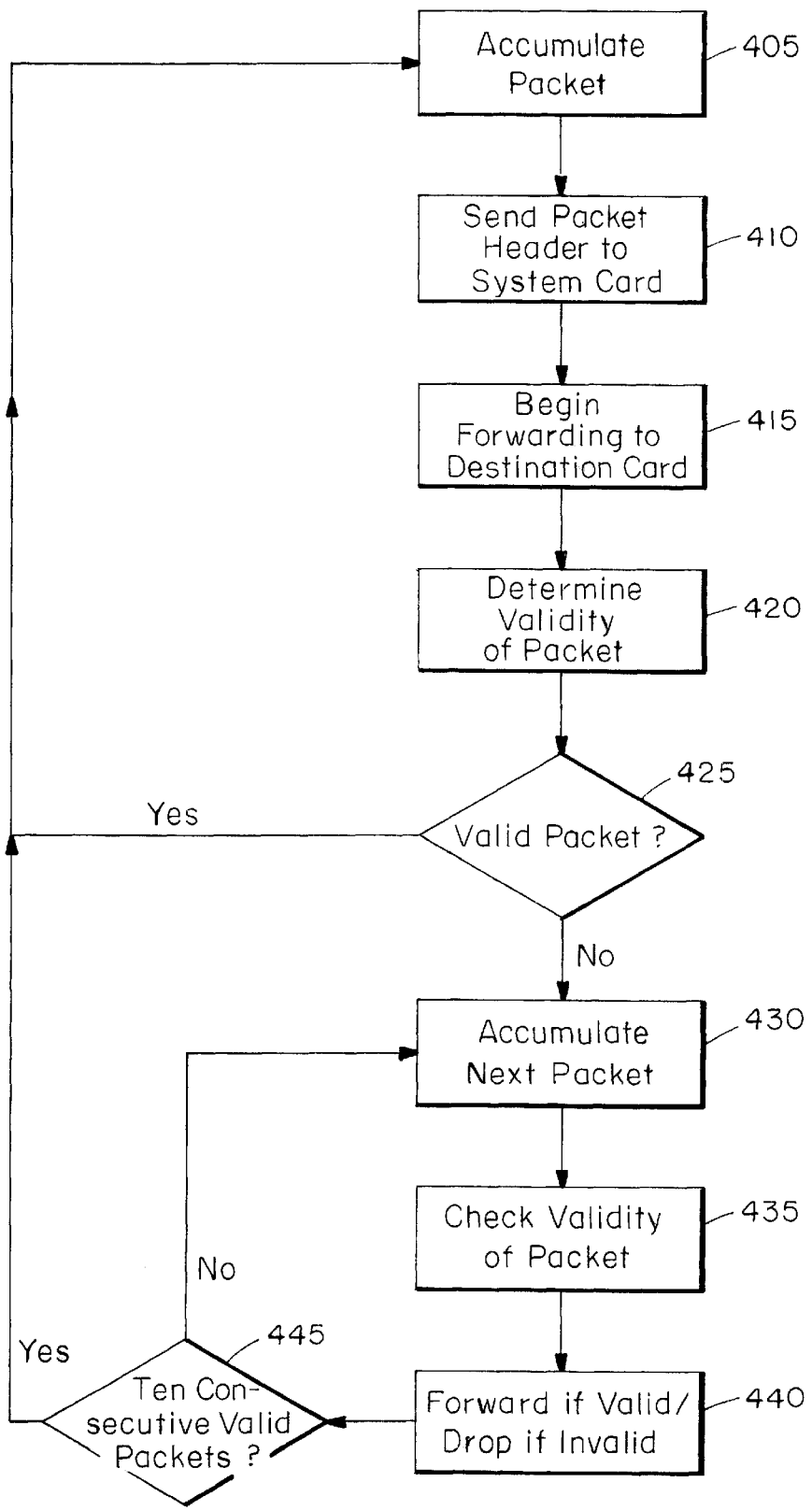
FIG. 4 is a flow diagram showing the process steps of adaptive cut-through switching of the present invention.

Turning now to FIG. 4, an adaptive cut-through switching process is described with reference to the hardware architecture shown in FIGS. 1–3. Packets received in through the ports P1–P8 of a LAN card 100 are accumulated in the packet RAM 135 under control of the packet processor 130 in step 405. As soon as the header of a particular packet has been completely received, the packet processor 130 sends the header information via the backplane to the address processor 220 contained on the system card 200 step 410. The address processor 220 returns the forwarding decision to the packet processor 130. The packet processor 130 then begins forwarding the not yet fully received packet contained in the packet RAM 135 to the packet processor of the destination LAN card in step 415 where the packet is started to be sent out the destination port to the addressed device. This occurs before the packet is fully received at the source port. In this way, the present invention operates somewhat the same as convention cut-through switching structures. The packet processor, however, checks the validity of the packet once the check-sum information has been received in step 420 even though the packet is already on its way to its destination device. If it turns out that the packet was in fact valid, the particular port remains in a cut-through switching status in which the packets are forwarded as soon as the forwarding decision is received by returning to step 405. If, however, it turns out that the packet was invalid, then the entire port is placed in a probationary status of the store and forward mode in the preferred embodiment. Alternatively, only the packets of the particular source address that exhibit invalidity or corruption could be placed into a store and forward mode, rather than the entire port. This second approach is most applicable where a particular sending device, rather than the cabling, is the basis of the packet corruption.

A port placed on probation is essentially converted to the store and forward switching. That is, as the packet is received through the LAN controller of the port, which has been placed on probation, the entire packet is accumulated in the packet RAM 135 in step 430 and its validity checked by reference to the check sum in step 435 before it is forwarded to its destination card and port in step 440. If it turns out the packet is invalid then the packet processor 130 simply discards that packet without forwarding it. Finally, in step 445, the packet processor determines whether ten consecutive valid packets have been received from a particular port. If ten consecutive valid packets have been received, the port is removed from probationary status and returned to a cut-through configuration.

The present invention essentially yields the advantages associated with both cut-through switching and store and forward switching. That is, in a properly operating local area network, most of the packets will in fact be valid and the latency associated with the check sum checking is unnecessary. In most cases, the present invention. entirely avoids this latency by essentially defaulting to cut-through switching as long as the transmission rate of the destination port is less than or equal to the rate of the source port. For a particular port receiving garbage either through the improper operation of a device attached to that port or some corruption in the cabling in that port, the present invention insulates the rest of the LAN by placing that port, or in some situations only packets with a particular source address, in a store and forward mode so that invalid packets will be dropped before they are forwarded or broadcasted through the LAN. Certain types of packets such as broadcast packets are always placed in a store and forward mode, however, since they involve every port. This helps to avoid broadcast storms.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A packet switching system including at least two network cards each receiving data packets via a plurality of associated ports, a system card, and an interconnect for connecting the system card to the network cards, wherein each one of the network cards comprises:

a plurality of port controllers for sending and receiving packets to and from a corresponding port;

a packet processor for buffering packets received by the port controllers and sending destination addresses to the system card via the interconnect, for receiving forwarding information from the system card, and for forwarding the packet in response to the forwarding information; and means for transmitting the packets between the port controllers and the packet processor.

2. The system of claim 1, wherein the system card comprises an address look-up table correlating destination addresses with the ports of the system.

3. The system of claim 1, wherein the packets are forwarded to different ones of the network cards indicated by the forwarding information via the interconnect.

4. The system of claim 1, wherein the packet processor is a hardware processor.

5. The system of claim 1, wherein the packet processor is a programmable gate array.

6. A switching method for a packet switching system receiving packets from and providing packets to networks via plural ports, the method comprising in combination:

determining whether a received packet is invalid, wherein said determining includes referencing a checksum included in the received packet; and upon determining that the received packet is invalid, converting from cut-through switching to store-and-forward switching for at least one subsequent received packet.

7. A method as described in claim 6, further comprising storing and checking validity prior to forwarding only for packets having source addresses from which invalid packets have been received.

8. A method as described in claim 6, further comprising storing and checking the validity of every packet from a port prior to forwarding in response to receiving an invalid packet from that port.

9. A method as described in claim 6, further comprising converting back to cut-through switching in response to receiving a predetermined number of valid packets.

* * * * *